March 18, 1969 J. M. COOTE 3,434,109
MULTIFIELD COMPARATOR ADJUSTABLE TO COMPARE ANY COMBINATIONS OF FIELDS AND TO PROVIDE SELECTABLE BASES OF COMPARISON
Filed June 1, 1966
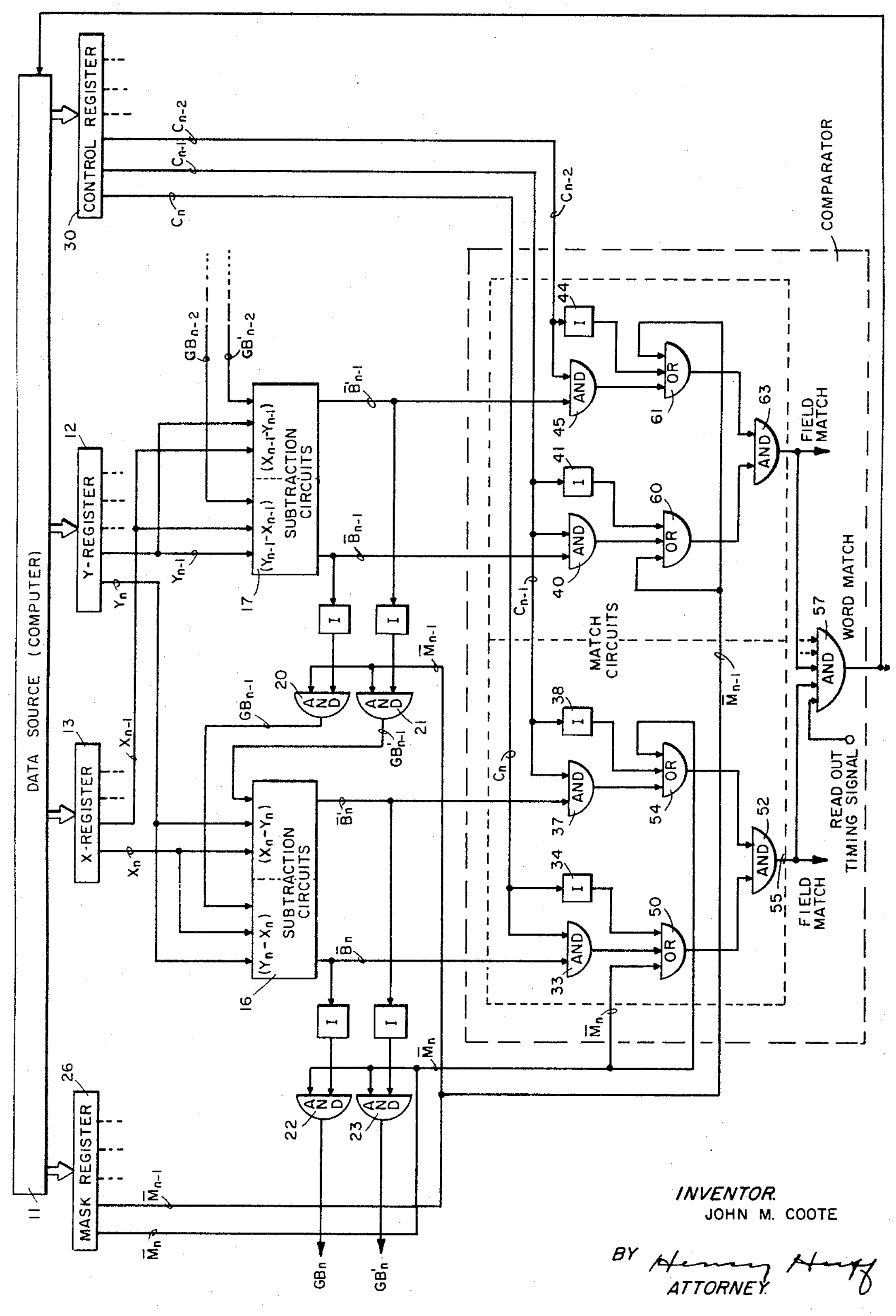
INVENTOR
JOHN M. COOTE
BY Henry Huff
ATTORNEY 3,434,109

MULTIFIELD COMPARATOR ADJUSTABLE TO COMPARE ANY COMBINATIONS OF FIELDS AND TO PROVIDE SELECTABLE BASES OF COMPARISON

John M. Coote, Kings Park, N.Y., assignor to Cutler-Hammer, Inc., Milwaukee, Wis., a corporation of Delaware Filed June 1, 1966, Ser. No. 554,495
U.S. Cl. 340—146.2 10 Claims
Int. Cl. G06f 7/06; G08c 13/00

ABSTRACT OF THE DISCLOSURE

This invention relates to a digital comparator device, and more particularly to such a device in which comparisons may be made between one or more corresponding groups of bits in two digital words, said groups being readily selectable as to their size and as to their positions within words, and the criteria or bases for comparison between the corresponding groups of bits likewise being readily selectable.

In many types of data processing operations such as data reduction, data base filtering, and general information retrieval, it is necessary to identify and compare against a reference certain digital data that represents effects, conditions, characteristics, etc., and which comprises only a portion of the available digital information. Data processing equipment most often handles digital information that is arranged into digital words that are comprised of a succession of digital bits wherein groups of adjacent bits within the word are associated with particular information. These groups of adjacent bits relating to respective information are known as information fields. At any one time, or in a particular portion of the processing operation of digital information, the information of interest within a digital word may be contained in one or more specified fields that constitute less than the full word, and any comparison of words at that time or portion of the processing operation is to be accomplished only with regard to these specified fields.

Comparison of information fields within a data word with corresponding information fields in a reference word has been accomplished in the past in general purpose computers by blanking or masking all of the bits in the respective words except for the bits in one particular field of interest. The computer then performs a comparison or match between the unmasked fields. If more than one field of a data word is to be matched with a corresponding field of a reference word the general purpose computer was programmed to sequentially perform the match on the sequentially occurring fields within the words. That is, if three pairs of corresponding fields within the words were to be matched, the computer would sequentially perform three independent matching operations wherein the respective words were sequentially masked to blank out all but the field to be compared during a particular matching operation. It is obvious that when a number of fields within words were to be matched, a considerable amount of time could be consumed in performing these successive operations, thus slowing down the operation of the computer.

Special purpose computers have been constructed for performing comparisons of a number of fields in a data word with corresponding fields in a reference word. These special purpose computers, however, can function to compare only specific fields within the respective words and can make a comparison only on one predetermined basis, that is, whether the magnitude of the digital representation of the field in the data word is equal to, smaller than, or larger than the magnitude of the digital representation in the corresponding field of the reference word. Although these special purpose computers perform their intended purpose, it is obvious that they do not possess the capability of being programmed to make comparisons between any selectable fields in any two words, nor can the bases of criteria of comparison of the various fields be changed at will.

It therefore is an object of this invention to provide digital comparator apparatus wherein one or a plurality of pairs of fields within words to be compared are readily selectable and the criteria of comparison are likewise selectable.

In the present invention use is made of the known fact that the most significant borrow term resulting from the subtraction of two binary numbers is a binary zero if the subtrahend is equal to or less than the minuend, and is a binary one if the subtrahend is greater than the minuend. The ambiguity as to whether the subtrahend is equal to or less than the minuend may be conclusively resolved by first subtracting the subtrahend from the minuend, then interchanging the subtrahend and minuend and subtracting again. If the two binary numbers are equal, the most significant borrow term will be a binary zero in both instances, but if the subtrahend is smaller than the minuend the most significant borrow terms will be 0 and 1, respectively, when the subtractions are performed in the order recited above. Therefore, the relative magnitudes of two binary numbers may be determined by subtracting the first from the second, then vice versa, and observing only the values of the most significant borrow bits. If one number is a reference number $y$ and the other number is an unknown or data number $x$, the above explained relationships of the most significant borrow bits to the relative magnitudes of the two numbers may be expressed as follows:

TABLE I

| Relative Magnitudes | Most significant borrow bit | |
|---|---|---|
| | (y—x) | (x—y) |
| x=y | 0 | 0 |
| x<y | 0 | 1 |
| x>y | 1 | 0 |

In the digital comparator apparatus of the present invention comparisons may be made simultaneously of any number of information fields in a data word with corresponding information fields in a reference word to determine if the magnitudes of the digital representations in the data information fields bear predetermined relationships to the digital representations in corresponding reference fields. The apparatus is extremely flexible in its operation because it may compare any number of fields within the words, the size and locations of fields within the words may be readily altered, and the predetermined relationship that constitutes the basis for comparison between a pair of fields may be changed at will.

The multifield comparator device of this invention includes a plurality of parallel operating subtraction means which are equal in number to the number of bits in the reference word with which comparisons will be made. Each subtraction means is coupled to receive a respective pair of bit signals from corresponding bit positions in the reference and data words so that subtractions are performed on pairs of corresponding bits of the two words. Each subtraction means performs two independent subtraction operations. It subtracts the data bit from reference bit ($y—x$), and also subtracts the reference bit from the data bit ($x—y$). Controllable gating means are provided for gating the respective borrow terms generated in each subtraction means to the next higher ordered subtraction means that subtracts the next most significant bits of the two words. Because comparisons are desired between corresponding fields within the two words, means must be provided to separate the words into fields. This is accomplished by providing what is called a mask word which contains the same number of binary bits and the same information fields as the reference and data words, and in which the highest order bit of each field is of one binary value and all other bits are of the other binary value. The successive bits of the mask word are respectively coupled to the controllable gating means between the plurality of subtraction means and function to control the propagation of borrow bits so that the borrow bits propagate in the usual manner within fields, but the most significant borrow bit in a field is not gated to the next adjacent field. This, in effect, causes the subtraction operation between the two words to be carried out on a field-to-field basis. Having provided means for grouping borrow terms into designated fields, the most significant borrow terms (resulting from the two subtraction operations) in each field now may be compared or matched with predetermined control bits to provide an indication of whether or not the binary representations of certain fields of interest in the data word bear a desired relationship to the binary representations of corresponding fields of the reference word.

A plurality of pairs of match circuits are provided, each pair coupled to receive the respective borrow terms $B_n$ and $B'_n$ generated from the respective subtraction means associated with the N bit position of the two binary words. Control bits C and C′, which may be any of the pairs of bits of Table I above, are coupled to the match circuits that receive the most significant borrow bits of each field, and these circuits function to detect the magnitude of the borrow terms in order to produce a match signal if a comparison or match does in fact exist. The control bits that are coupled to the match circuits associated with the most significant borrow terms of fields not of interest are programmed to have no effect on the total match indication of all fieds actually being compared. The above-mentioned mask word also controls the output of the match circuits to permit only the match circuits associated with the most significant borrow bits of the selected fields to produce a match signal if a match does in fact exist. If no match exists in the match circuit associated with the most significant borrow bits of a field, a no-match signal is produced. The outputs of all match circuits are coupled to an output AND circuit through suitable logic circuitry so that a word match signal is produced if in fact all corresponding fields of interest in the two words match, i.e., are of relative magnitudes which satisfies the selected conditions.

The device is flexible in its operation because the fields may be established in any desired arrangement by suitably programming the match word and the control bits. Any desired basis for comparison may be established in accordance with Table I by suitably programming the control bits.

The invention will be described by referring to the accompanying drawing which is a simplified representation of the circuitry that is required to perform the comparison operation on two pairs of corresponding bits of two binary words, it being assumed that one pair of bits being compared represents the most significant bits of corresponding information fields in the two words.

In describing the apparatus it will be assumed that the active input signal in the apparatus is a data word containing a number of information fields that correspond to various items of interest that appear on checks that might be issued by a business concern. A simplified and purely hypothetical word will be used as an example in order to simplify the explanation. It further will be assumed that a coded punched card exists for each issued check and that it now is desired to identify all punched cards that correspond to checks that were issued during the first quarter of the year 1966 and which exceed the value of $5,000. All checks were numbered consecutively as issued and it is known that the first check issued in that quarter was number one and the last check issued in that quarter was number 165. All punched cards of interest may be identified as such if their sequential number is greater than zero and less than 166, their year of issue is 1966, and their amount is greater than $5,000. These various items of interest regarding a check are punched in the card in respective locations called fields, and a binary word that contains all the identifying information relating to a check similarly may be separated into fields comprised of groups of binary bits whose binary representations correspond to the information punched in the fields on the cards. A reference word is required in order that comparisons may be made to determine if a data word is a desired word. This reference word need only contain fields relating to sequence number, year, and dollar amount since these are the only information items that form the basis on which a selection will be made. Set forth below in Table II are binary words that will serve as examples of the data word and reference word. Table II also contains examples of a mask word and a control word which will be explained below.

TABLE II

| Check No. | Year | Day | Month | Value | Payee | Word |
|---|---|---|---|---|---|---|
| a | b | c | d | e | f | |
| 010100110 | 1000010 | 000000 | 0000 | 001001110001000 | 0000 | Reference (y) |
| 010010011 | 1000010 | 001111 | 0010 | 001110101001100 | 1101 | Data (x) |
| 100000000 | 1000000 | 100000 | 1000 | 100000000000000 | 1000 | Mask (x to y) |
| 100000000 | 1100000 | 000000 | 0000 | 010000000000000 | 0000 | Control (x to y) |

The bits in the words are grouped into information fields which are identified by name at the top of the table and which also are numbered from "*a*" through "*f*". It should be understood that in actual practice the fields are not set apart as in Table II but all bits in a word appear consecutively one after another.

It will be seen from Table II that a data word ($x$) will be selected as a desired word if the binary representations in its information fields "*a*", "*b*", and "*e*" bear the following relationships to the corresponding fields of the reference word ($y$):

*a* ---------------------------------------- $x<y$
*b* ---------------------------------------- $x=y$
*e* ---------------------------------------- $x>y$

Referring now in detail to the drawing, all data that enters the comparator apparatus comes from a data source 11 which may be a digital computer. The reference word $y$ is entered into the $y$-register 12 and the data word $x$ which is to be compared with the reference word is entered into the $x$-register. It is assumed that the $y_n$ and $y_{n-1}$ outputs of $y$-register 12 are the two most significant bits of a given field in reference word $y$ and that the $x_n$ and $x_{n-1}$ outputs of $x$-register 13 are the two most significant bits of the corresponding field in data word $x$. The most significant bit $y_n$ from $y$-register 12 is connected to the two halves of the subtraction means 16, and similarly the most significant bit $x_n$ from $x$-register 13 is coupled to the two halves of subtraction means 16. The second most significant bit $y_{n-1}$ of $y$-register 12 is coupled to the two halves of subtraction means 17 and the second most significant bit $x_{n-1}$ from $x$-register 13 is coupled to the two halves of subtraction means 17. Each of the subtraction means 16 and 17 performs two subtraction operations, one being the subtraction of the data bit from the reference bit ($y-x$), and the other being the subtraction of the reference bit from the data bit ($x-y$). Each of the subtraction means 16 and 17 may include two full subtractors well known in the art. To accomplish the full subtraction operations the respective borrow bits from the next least significant bit subtractor means is coupled into each of the subtraction means 17 and 16, as illustrated. Because the comparison operation that is performed by the apparatus of this invention performs a comparison only on the most significant borrow bits generated by the subtraction operations within a given field, subtraction means 16 and 17 only produces borrow terms. Difference terms that ordinarily are generated in a subtraction operation are not generated. It will be understood, however, that should additional logical operations be desired it may be advantageous to in fact generate difference terms.

Because of the particular instrumentation which has been chosen to carry out the logic operations, it is desirable that the "nots" of the borrow terms be generated rather than the true borrow terms.

The borrow terms $\overline{B}_{n-1}$ and $\overline{B}'_{n-1}$ that are generated in subtraction means 17 are respectively coupled in complement from as $B_{n-1}$ and $B'_{n-1}$ to AND gates 20 and 21 and the outputs of these AND gates are coupled to the respective halves of the subtraction means 16. The borrow terms $\overline{B}_n$ and $\overline{B}'_n$ that are generated in subtraction means 16 are respectively coupled in complement form to AND gates 22 and 23 and the outputs of these AND gates are coupled to the respective halves of the next higher ordered subtraction means that performs the subtraction operations on the next most significant bits of the two words. Second inputs to the pairs of AND gates 20, 21 and 22, 23 are respective bits of a mask word that is stored in mask register 26. The function of the mask word is to establish the information fields within the operating equipment so that comparisons are performed on a field-to-field basis. Referring back to Table II, it may be seen that the mask word is comprised of a binary 1 in the most significant bit position of each field and all other bits within a field are binary zeros. Therefore, by mere inspection of a mask word the locations and sizes of the various fields are readily apparent. Because the "nots" of the mask word bits will be utilized in the logical operations to be described below, the outputs of mask register 26 are represented as the nots rather than the true values of the binary bits. The not of the most significant mask bit $\overline{M}_m$ is coupled to AND gates 22 and 23, and the not of the second most significant mask bit $\overline{M}_{m-1}$ is coupled to the respective AND gates 20 and 21. Because the not of the most significant mask bit is a zero this bit will disable AND gates 22 and 23 and thus will prevent the borrow terms from subtraction means 16 from propagating to the next higher ordered subtraction means. In this manner, the most significant mask bits establish, in effect, field boundaries separating one field from the next adjacent field since the borrow terms do not propagate between fields. The not of the second most significant mask bit $\overline{M}_{m-1}$ is a binary 1 and enables AND gates 20 and 21 to pass borrow terms from subtraction means 17 to subtraction means 16. Thus, all mask bits except the most significant bit within a given mask field allow the borrow terms to propagate within a field thus allowing a normal subtraction process to be carried out within each individual field.

Mask register 26 may be programmed in any desired manner so that its fields will correspond to the information fields in any words that are to be compared and no alteration of the equipment itself is necessary. This feature greatly adds to the flexibility and adaptability of operation of the device of this invention.

Having now obtained two gated borrow terms GB and GB' for each bit portion within a field the most significant borrow terms within each field now must be compared with control bits to determine whether or not the data word bears a desired relationship to the reference word. The aforementioned control bits are contained in control register 30 which stores a control word whose characteristics may be seen by referring to Table II above. The first two bits in each field of the control word are the two bits which form the basis for comparison. Thus, all bits in a control word other than the two most significant bits always are of the same binary value, which in the present example are binary zeros. The two most significant bits in a field of the control word are chosen so that a comparison will be established in accordance with the criteria set forth in Table I above. Conceivably, exactly the same binary values could be used in a control word as are illustrated in Table I. However, because of the manner in which the present apparatus was instrumented a desired condition for comparison set up in a field of the control word will be manifested by binary bits whose values are just opposite to those shown in Table I above.

If no comparison is to be performed between corresponding fields of the reference and data words the first two bits in the corresponding field of the control word both are binary zeros. In the above-assumed situation concerning the value of checks of a business concern, no comparison would be desired between fields "*c*," "*d*" and "*f*" of the reference and data words. Reference to Table II will indicate that the first two bits in those fields of the control word all are zeros.

The most significant bit $C_n$ of the control word in control register 30 is coupled into AND gate 33 along with the not of the most significant borrow bit $\overline{B}_n$ which is generated from the subtraction operation $(y_n-x_n)$ performed in subtraction means 16. The most significant control bit $C_n$ also is coupled to inverter 34. The second most significant control bit $C_{n-1}$ is coupled to AND gate 37 along with the not of the most significant borrow bit $\overline{B}'_n$ that is generated from a subtraction operation $(x_n-y_n)$ performed in subtraction means 16. The second most significant control bit $C_{n-1}$ also is coupled to inverter 38. The second most significant control bit $C_{n-1}$ also is coupled to AND gate 40 along with the not of the second most significant borrow bit $\overline{B}_{n-1}$ that is generated during the subtraction operation $(y_{n-1}-x_{n-1})$ in subtraction means 17. $C_{n-1}$ also is coupled to inverter 41. The third most significant control bit $C_{n-2}$ is coupled to inverter 44 and to AND gate 45 which also is coupled to receive the not of the second most significant borrow bit $B'_{n-1}$ that is generated from the subtraction operation $$(x_{n-1}-y_{n-1})$$

in subtraction means 17. As will be explained immediately hereafter the comparison operation performed with the borrow bits generated in the subtraction operations of the second and all subsequent most significant bits of a field will have no effect on the operation of the comparator apparatus of this invention since the criteria of comparison is based solely on the two borrow terms generated in the subtraction operations of the most significant bits in a field. Therefore, the fact that $C_{n-1}$ is coupled to both AND gates 37 and 40 is of no consequence in the ultimate operation of the comparator.

Explaining in detail the operation of the comparator portion of the apparatus with the example assumed above that the *e* fields of the *x* and *y* words are to be compared, reference to Table II will indicate that the value represented by the binary numbers in the *e* field of the data word $(x)$ is $7,500, and that the value represented by the binary numbers in *e* field of the lower limit reference work $(y)$ is $5,000. Therefore, the data word is larger than the reference word and the most significant borrow bit generated in subtraction operation $(x-y)$ will be a binary one. Therefore, the not of the most significant borrow bit $\overline{B}_n$ will be a binary zero and the not of the most significant borrow term $\overline{B}'_n$ generated from the subtraction operation $(x-y)$ will be a binary one. The binary values of the two most significant control bits $C_n$ and $C_{n-1}$ will be zero and one, respectively. Thus, the two input signals $\overline{B}_n$ and $C_n$ to AND gate 33 both will be zeros so that there is no output from AND gate 33. The zero coupled into inverter 34 will be converted to a one and will couple thru OR gate 50. One of the three inputs to OR gate 50, and similarly to OR gate 54, is the not of the most significant mask bit $\overline{M}_n$ which is a zero. It thus may be seen that the most significant mask bit $\overline{M}_n$ never can affect the comparison or match operation of the most significant borrow bits of a field. The binary one output signal from OR gate 50 is coupled as an input to AND gate 52. The input signals $\overline{B}'_n$ and $C_{n-1}$ to AND gate 37 both will be binary ones which will pass through the AND gate and through the OR gate 54, and will appear as the second input to AND gate 52. Because both inputs to AND gate 52 are binary ones, an output signal is produced on output line 55 indicating that a comparison or match has been made between nots of the most significant borrows bits $\overline{B}_n$ and $\overline{B}'_n$ in the field and the first two most significant control bits $C_n$ and $C_{n-1}$. This output signal from AND gate 52, which is indicative of a field match, then is coupled to AND gate 57 which has a plurality of inputs, each of which is a field match indicating signal. The output of AND gate 57 is a word match signal indicating that all fields actually being compared within a word do or do not match. Within a given field the second most significant and all lower order borrow bits are rendered ineffective to alter the match condition established in AND gate 52 by the fact that the second most significant mask bit $\overline{M}_{n-1}$ is coupled to both OR gates 60 and 61 associated with the nots of the second most significant borrow bits $\overline{B}_{n-1}$ and $\overline{B}'_{n-1}$. Because the nots of the second bit (and all subsequent bits) of the mask word always will be a binary one it will pass through the respective OR gates 60 and 61 and will actuate AND gate 63 to produce a field match signal which in turn is coupled to the word match AND gate 57, and this is always true regardless of the values of $\overline{B}_{n-1}$, $\overline{B}'_{n-1}$, $C_{n-1}$, and $C_{n-2}$.

Reviewing now the control that the mask bits exercise over AND gates 52 it will be seen that the not of the most significant mask bit $\overline{M}_n$ can never affect the operation of gate 52 because $\overline{M}_n$ always will be a binary zero. Therefore, the only factors that determine whether or not AND gate 52 passes a signal is the existence or nonexistence of a match between $\overline{B}_n$, $\overline{B}'_n$ and $C_n$, $C_{n-1}$. On the other hand, the second and all subsequent nots of the mask bits always will be binary ones which will pass through the pair of OR gates such as 60 and 61, and thus always will appear at the input of the AND gate 63 so as to provide a binary one input to word match AND gate 57. Thus, the only signal which can prevent AND gate 57 from passing a match signal will be the signal that results from the comparison operation performed on the nots of the most significant borrow bits $\overline{B}_n$ and $\overline{B}'_n$. It therefore may be seen that the mask word not only controls the gating of the borrow terms between the consecutively ordered subtraction means, but it also controls the match circuitry in such a manner that only the most significant borrow bits can provide an indication of whether or not a match or comparison does in fact exist between specified corresponding fields.

In the event that no comparison is desired between corresponding fields of two words, control bits $C_n$ and $C_{n-1}$ will be binary zeroes, as mentioned above. Referring to the accompanying drawing to see how the circuitry functions with these control signals it will be seen that binary zeroes will be coupled into both inverters 34 and 38, so that binary ones will respectively pass through OR gates 50 and 54 and will be present at the input of AND gate 52. Gate 52 therefore, always will produce a field match signal that is coupled to word match AND gate 57. This type of operation therefore effectively eliminates that field from consideration, as is desired.

The circuitry associated with all fields of complete reference and data words is arranged in parallel and will be substantially identical to that just described and is completely adaptable to process reference and data words irrespective of the sizes and locations within words of the corresponding fields. To properly process any given reference and data words suitable adjustments are made in the mask word so that the boundaries of information fields are established by binary ones. Similarly, any basis or criteria for comparison of fields may be readily established by the suitable choice of the two most significant bits of the corresponding control field in accordance with Table I, as previously explained.

The comparator apparatus of this invention is extremely fast acting because it may simultaneously perform comparison operations on any number of given fields within the reference and data words. An output signal is immediately available indicating whether or not there is a match between all corresponding fields being matched. It also may be desirable to know whether or not certain fields within the reference and data words match irrespective of whether or not all fields within the words will match. The field match signals are available from AND gates such as AND gate 52, although suitable provisions must be met to sample only the field match signals associated with the most significant borrow bits. This easily could be done by using the mask word from mask register 26 to control respective gating means which then will pass only the most significant comparison information.

Although one specific instrumentation of the comparator apparatus has been shown and described, it will be understood by those skilled in the art that other equivalent instrumentations are available. The specific instrumentation described above is not to be considered as a limitation or restriction on the present invention. The important features of this invention relate to the ability to perform simultaneous matches on a plurality of fields within words and the adaptability of the apparatus to readily change the fields and the comparison criteria by means of the unique utilization of the mask and control words.

I claim:

1. Comparator apparatus comprising, subtraction means responsive to first and second digital words to produce a plurality of pairs of borrow terms wherein each pair results from two subtraction operations in which the respective corresponding bits of the two words are interchanged, means controlling said subtraction means for preventing selected pairs of borrow terms from influencing the subtraction operations of their next most significant pair of corresponding bits, means for providing a plurality of pairs of control bits to be respectively compared against said plurality of borrow terms, said pairs of control bits each having predetermined binary values that are based on desired relationships between said two digital words, comparator means for comparing pairs of borrow terms with related pairs of control bits, said means controlling the subtraction means also controlling said comparator means to permit a true comparison only of said selected pairs of borrow terms with their respective pairs of control bits.

2. Multifield comparator apparatus comprising, a plurality of parallel operating consecutively ordered subtraction means each coupled to receive a respective pair of corresponding bits of first and second digital words, each subtraction means being operable to produce first and second borrow terms resulting from two subtraction operations in which the respective bits of the two words are interchanged, controllable gating means for gating the two borrow terms from each subtraction means to the next higher ordered subtraction means, gating control means for preventing only designated ones of said pairs of borrow terms from gating to their next higher ordered subtraction means, means for providing a plurality of pairs of control bits to be respectively compared against said pairs of borrow terms, said pairs of control bits each having predetermined binary values that are based on a desired relationship between said digital words, comparator means for comparing pairs of borrow terms with related pairs of control bits, said gating control means also controlling said comparator means to permit a true comparison only of said designated pairs of borrow terms with their respective pairs of control bits.

3. The combination claimed in claim 2 wherein said gating control means is adjustable in its control of the gating means to designate different pairs of borrow terms that are prevented from gating to their next higher ordered subtraction means and to control said comparator means to permit true comparison only of said different designated pairs of borrow terms with their respective pairs of control bits.

4. The combination claimed in claim 2 wherein said means for providing the plurality of pairs of control bits is adjustable to provide different binary values for the pairs of control bits to establish any desired predetermined relationship as the basis of comparison between the two words.

5. A digital comparator having multifield comparison capabilities comprising, means for providing respective first and second successions of digital bits wherein the two successions have corresponding groups of successive bits which are related to form corresponding digital information fields, means for digitally subtracting the bits of said first succession from the corresponding bits of the second succession to produce a first plurality of borrow bits, means for digitally subtracting the bits of said second succession from the corresponding bits of the first succession to produce a second plurality of borrow bits, means for coupling the borrow bits of each plurality to the respective subtracting means associated with the next most significant bit within a respective field, means for preventing the most significant borrow bits that result from the subtractions of the most significant bits of corresponding fields from affecting the respective subtractions of the least significant bits of the next adjacent pair of corresponding fields in said successions, means for providing a succession of control bits that are associated in groups that correspond to the fields of said first and second successions, at least one selected group of said control bits having predetermined digital values in its two most significant bit positions, means for respectively comparing the two most significant bits of the selected group of control bits with the most significant borrow bits obtained from the two subtractions of the bits of the corresponding fields of said first and second successions to produce a first digital output if an equality exists and to produce a second digital output if an inequality exists.

6. Digital apparatus comprising, means for providing first and second digital words each comprised of a plurality of bits that are associated in fields that correspond to fields in the other word, a plurality of consecutively ordered digital subtraction means operating in parallel to obtain a first plurality of borrow bits that result from the subtraction of the bits of the first word from corresponding bits of the second word and to obtain a second plurality of borrow bits that result from the subtraction of bits of the second word from corresponding bits of the first word, means providing a digital mask word having a plurality of bits which are associated in predetermined groups to establish fields that correspond to fields in said two digital words, the most significant bit in each field of said mask word having a given digital value and the remaining bits in each field having a different digital value, a pair of gating means associated with each of said subtraction means for gating to the next higher ordered subtraction means the respective borrow bits resulting from the two subtractions of a pair of corresponding bits of said two digital words, a bit of the mask word coupled to a pair of gating means having the same order of significance within the mask word as do the bits of the digital words which gave rise to the borrow bits that are coupled to the same pair of gating means, said pairs of gating means operating to block the passage of borrow bits in response to mask bits that constitute the most significant bit of a mask field and passing borrow bits in response to all other mask bits, means for providing a control word comprised of a plurality of bits that are associated in fields that correspond to the fields of said digital words, the two most significant bits in each field of the comparator word being of given digital values that bear predetermined relationships to the pair of borrow bits that are generated from the subtractions of the most significant bits of corresponding fields of said digital words, a plurality of parallel operating comparator means for comparing the pairs of borrow bits resulting from the two subtractions of the correspondingly order bits of the two data words with respective pairs of control bits, wherein the two most significant bits within a control field are compared with the borrow bits resulting from the subtractions of the most significant bits of corresponding fields in the digital words, the bits of said mask word being respectively coupled to said plurality of comparator means with the most significant bit of each mask field coupled to the same comparator means to which the two most significant bits of the corresponding control field are coupled, said comparator means being operable to produce true comparisons only when a most significant bit of a mask field is coupled thereto.

7. A digital comparator having multifield comparison capabilities comprising, a first register for storing a reference word comprised of a plurality of bits that are associated in information fields, a second register for storing a data word comprised of a plurality of bits that are associated in information fields corresponding to those in said reference word, a plurality of parallel operating consecutively ordered subtraction means respectively responsive to a pair of corresponding bits of said two words to perform two subtraction operations wherein the data word is subtracted from the reference word, and vice-versa, a mask register for storing a mask word comprised of a plurality of bits that are associated in information fields corresponding to the fields of the reference word, the most significant bit in each mask field being of one binary value and the remainder of the bits in the mask fields being of a different binary value, gating means coupled between adjacent pairs of subtraction means to couple the borrow terms produced in each subtraction means to the next higher ordered subtraction means, means for coupling each bit of each mask field to respective gating means that receive the pair of borrow terms resulting from the two subtractions of reference and data bits of corresponding significance in corresponding fields, said gating means responding to the most significant bit in each mask field to prevent a respective pair of borrow terms from propagating to the next most significant subtraction means, whereby the borrow terms are associated in fields corresponding to the fields of said reference word, a control register supplying a plurality of control bits that are associated in fields corresponding to the fields of said reference word, a plurality of parallel operating comparator means each coupled to receive a pair of borrow terms and a pair of control bits from a corresponding control field, the pair of control bits coupled to the same comparator means as a pair of most significant borrow bits having predetermined values based on a desired relationship between the corresponding reference and data fields, the respective mask bits being coupled to the same comparator means as their corresponding pairs of borrow terms and permitting only the control means coupled to receive the pairs of most significant bits of a borrow field to produce an output signal representing a true comparison and permitting all other comparison means to produce a signal of a given binary value.

8. The combination claimed in claim 7 and further including,

AND gate means coupled to receive the output of each of said comparison means and operating to produce an output signal only when the true comparison of the most significant bits in designated borrow fields indicate that said desired relationship exists between designated corresponding data and reference fields.

9. The combination claimed in claim 7 and further including, means for changing the binary values of the bits in said mask register, thereby providing means for designating different information fields in said two words.

10. The combination claimed in claim 7 and further including, means for changing the binary values of the bits in said control register, thereby providing means for presenting different comparison bases between any designated fields in said two words.

References Cited

UNITED STATES PATENTS

| | | | |
|---|---|---|---|
| 3,105,143 | 9/1963 | Hosier et al. | 235—177 X |
| 3,167,740 | 1/1965 | King et al. | 235—177 X |

EUGENE G. BOTZ, *Primary Examiner.*

U.S. Cl. X.R.

235—177